United States Patent [19]

Molitor

[11] Patent Number: 4,492,911
[45] Date of Patent: Jan. 8, 1985

[54] STATIC PHASE CONVERTER

[76] Inventor: Robert L. Molitor, 16 Oak Grove Dr., Hampshire, Ill. 60140

[21] Appl. No.: 517,506

[22] Filed: Jul. 26, 1983

[51] Int. Cl.³ .............................................. H02P 1/18
[52] U.S. Cl. .................................. 318/779; 318/781; 318/794
[58] Field of Search ................................. 318/781–797, 318/417–418, 768, 769, 772, 776, 81 T, 385–386

[56] References Cited

U.S. PATENT DOCUMENTS

| | | | |
|---|---|---|---|
| 2,593,987 | 4/1952 | Courtney et al. | 318/768 |
| 2,832,925 | 4/1958 | Koll et al. | 318/768 |
| 2,836,780 | 5/1958 | List, Jr. et al. | 318/795 |
| 3,122,693 | 2/1964 | Hermansdorfer | 318/768 |
| 3,201,673 | 8/1965 | Williford et al. | 318/768 |
| 3,202,896 | 8/1965 | Lewas | 318/768 |
| 3,488,572 | 1/1970 | Tamm | 318/793 |
| 3,725,757 | 4/1973 | Ehrens et al. | 318/795 |
| 4,063,135 | 12/1977 | Wanlass | 318/795 |
| 4,066,937 | 1/1978 | Pfarrer et al. | 318/795 |
| 4,095,149 | 6/1978 | Wanlass | 318/795 |
| 4,272,714 | 6/1981 | Vind | 318/794 |
| 4,348,626 | 9/1982 | London | 318/795 |

Primary Examiner—E. A. Goldberg
Assistant Examiner—Arthur G. Evans
Attorney, Agent, or Firm—Hill, Van Santen, Steadman & Simpson

[57] ABSTRACT

Single-speed, three-phase motors and two-speed, three-phase motors are started and run by a static phase converter which comprises a timing circuit, adjustable for a starting interval, and a switching device which configures a plurality of capacitors, with respect to motor windings, so that a starting capacitance and a running capacitance are connected during a starting mode for a high-torque condition, and, thereafter, the run capacitance is connected for running the motor.

23 Claims, 1 Drawing Figure

U.S. Patent   Jan. 8, 1985   4,492,911
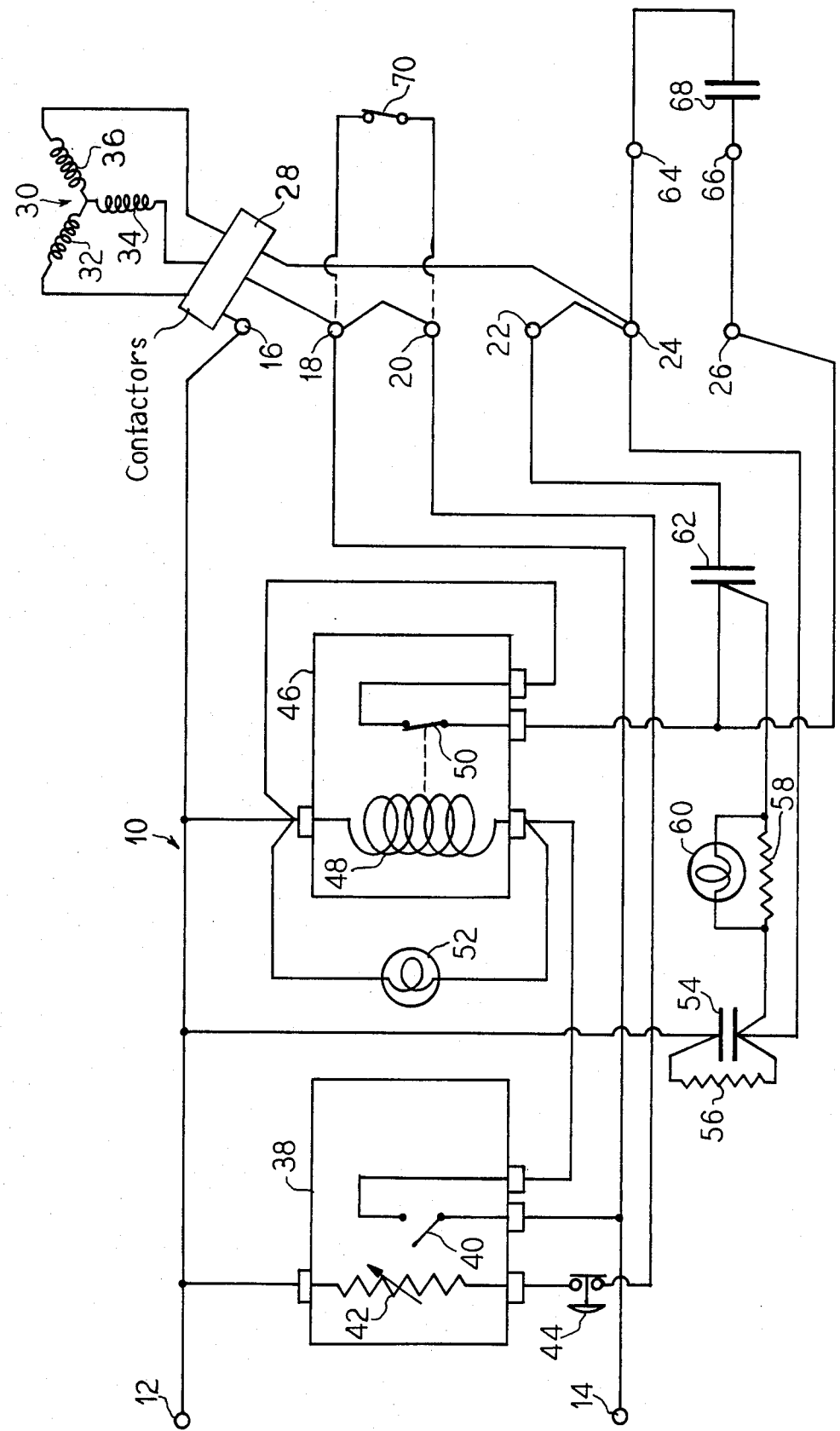

STATIC PHASE CONVERTER

BACKGROUND OF THE INVENTION

1. Field of the Invention

The present invention relates to a control circuit for operating single-speed and two-speed three-phase motors from single-phase current.

2. Description of the Prior Art

Control circuits for starting and operating three-phase motors, including single-speed and two-speed motors are known in the art. All of these known techniques of applying static phase converters have heretofore employed a feedback voltage or current derived from the motor winding or windings or motor control. By this exact nature, the motor winding characteristics and, therefore, the horsepower must be exactly matched to the control circuit for proper and reliable operation.

Typically, the starting torque is applied to only one of the three motor windings and, after achieving synchronous speed, is disconnected from that winding to run on a single phase source only one two windings in the run mode. Synchronous speed, as is well known, is that speed which is the designed operating speed of the motor, whereby the rotor attains the speed and locks thereto. The disconnection of the starting torque current from the motor winding results in an obvious one-third reduction in horsepower. Inasmuch as the motor will be used in the manner and purpose for which it was designed, the loss of one winding in the run mode produces overheating and high noise levels due to the imbalance of winding currents. Disconnection is accomplished by way of a sensing circuit which constitutes a relay utilizing the back EMF from the motor windings to operate the voltage- or current- sensing relay.

It is unlikely, under normal operating conditions, once the rotor has attained synchronous speed, sufficient load would be applied to the rotor to cause a complete breakaway from synchronous speed such that the starting torque previously applied would be required to restore the rotor back to synchronous speed. In the case of extreme and excessive load conditions, the characteristics of the motor are such that an increased slip develops between the rotor and field windings and the load current increases to such an extent that thermal protective devices open and disconnect the motor from the power supply. Therefore, it is not practical to attempt to reapply starting torque during these periods of excessive and inordinate load conditions. It is necessary, however, that during start-up of a motor subjected to reasonable starting loads, such as air compressors, gear boxes, mixing machines and the like, that the starting torque be applied for as long a period as necessary to overcome these excessive starting loads and thereby attain the required synchronous speed.

If the relay operates too soon, the motor will not achieve full or synchronous speed. If the relay operates too late, the intermittent duty electrolytic capacitor and the motor windings will be damaged by excessive starting current.

It is obvious to those skilled in the art that this type of phase conversion must be designed and adjusted for each different horsepower rating, resulting in many different models.

Also, deficient in previous structures is the ability to operate two-speed motors from a single control circuit. The use of two-speed motors has increased dramatically, particularly in the application of lathes and milling machines for which the available working speeds can be coupled simply by switching from low-speed winding connections to high-speed winding connections. Again, a feedback voltage or current is required from either of the two separate windings to operate a relay to disconnect the starting torque at, typically, 70% of synchronous speed. The difference in motor winding impedance produces voltage and current variations too great for a single coil relay to operate at the conventional 70-80% of synchronous speed, for both high and low horsepower and speed ratings.

SUMMARY OF THE INVENTION

It is therefore the object of the invention to remove the dependency of the phase converter control circuit on the feedback EMF from the motor windings as a function of rotor speed. This freedom allows the application of starting torque for as long as necessary to overcome the motor load and achieve the full synchronous speed.

According to the invention, the application of starting torque may extend beyond the 70-80% limitation inherent in the aforementioned motor starting control circuits. This feature of the invention is particularly advantageous when the applied motor load comprises many gears, belts or other high-friction or inertia affected machinery, which would otherwise prevent the rotor from attaining synchronous speed after reaching the 70-80% point. It is common in such situations for the rotor to drop back into the starting mode, thereby causing excessive heating and premature destruction of the intermittent-duty electrolytic capacitors normally used in this type of circuit.

Another object of the invention is to provide a static phase converter which is universal with respect to three-phase, single-speed and two-speed motors. This feature of the invention provides that a single model of the converter may be employed for many single-speed and two-speed applications.

Another object of the invention, attendant to the universality object, is to provide for simple adaptation of the converter to different intervals of application of the starting torque.

A further attendant object is to provide for simple adaptation of the converter to motors of different horsepower rating.

According to the invention, a simple static phase converter is provided which comprises starting capacitance and running capacitance which are interconnected with resistance and with switch means such that prior to energization by a single-phase source, the starting capacitance is connected in circuit with windings of a motor, and, after application of the voltage source and, therefore, the starting torque, for a predetermined interval, the starting capacitance is replaced by the running capacitance. The switch means is operated under the control of a timer. Advantageously, the timing interval is variable, for example over a timing range of 0.25-5 seconds, and in a particular embodiment is controlled by a potentiometer. Also, the switch means may be constituted by a relay operated under the control of the timer.

In order to adapt the converter of the present invention to various horsepower ratings, for example ⅛-10 horsepower, an additional capacitance may be connected in parallel with the starting capacitance. This additional capacitance may be a single capacitor or a plurality of series-parallel connected capacitors selectively connected in circuit in parallel with the starting capacitance in accordance with the horsepower rating of the motor.

A static phase converter constructed in accordance with the present invention may also advantageously be provided with a reset capability, such as a simple pushbutton switch, which causes the switch means to reconfigure the starting and running capacitances for reapplication of starting torque. Advantageously, and since the static phase converter may be mounted at a distance from the motor and not quickly accessible by an operator, a remote of this switch may be provided for manual operation, or the remote switch may be automatically operated. In the latter case, the invention is advantageously applicable to intermittent load situations, such as air compressors and the like, in which case the remote switch would be the pressure switch of the compressed air tank.

According to the invention, the timer contacts are connected in series with the relay coil of a power relay for connection thereof across the single-phase alternating current source. The time is reset by an interruption of source voltage by a normally-closed pushbutton. Upon application of the single-phase power to the static phase converter and motor, the power relay contacts, which are normally closed, provide instant application of starting torque to the motor windings. Intermittent duty electrolytic bipolar capacitors are employed to produce the necessary phase shift to develop the high starting torque required to achieve synchronous speed. As mentioned above, the values of starting capacitance can be changed by switching networks of capacitors in series and/or parallel arrangements.

The timing interval immediately begins upon the application of the alternating current source and, when complete, operates the coil of the power relay to disconnect the starting torque from the motor windings. This interval of starting torque is adjustable and controlled by the operator to suit the particular load conditions that may exist for particular motor applications. The time repeatability factor is extremely high for the type of timer employed in an embodiment of the invention, namely one sold by National Controls Corp of Lombard, Ill., under the designation Q1F-00005-315. A suitable relay is a 240 VAC relay manufactured by the General Electric Company.

By the precise timing method disclosed herein, the starting condition can be controlled and limited to avoid excessive current and overheating of the motor windings and converter components. For two-speed motors, the timing interval is simply increased for the high-speed winding to provide adequate starting torque to achieve full synchronous speed. In extremely heavy starting load conditions, the starting torque can be applied beyond the 70% minimum rotor speed up to 130% of full synchronous speed to assure proper operation of the motor and load. Upon removal of the starting torque, it is desirable to connect a continuous run type capacitor of low capacitance value to improve winding current balance and efficiency, as will be appreciated by those skilled in the art.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a schematic circuit diagram of a static phase converter constructed in accordance with the invention and connected to a three-phase motor and connected to additional starting torque capacitance.

DESCRIPTION OF THE PREFERRED EMBODIMENTS

Because of the various applications of the invention and the various adaptations for different operating situations, each basic application and adaptation will be discussed separately below.

Three-Phase, Single Speed

Referring to the drawing, a static phase converter is generally illustrated at 10 as comprising a pair of input terminals 12 and 14 for connection to an alternating current source (not shown) of, for example, 240 VAC, by way of an on-off switch (also not shown). The static converter also comprises a plurality of output terminals 16-26 for connection to external devices such as a motor, a torque adaptation device and a remote control switch. As shown, the output terminals 16, 18 and 24 are connected to the windings 32, 34 and 36 of a single-speed, three-phase motor 30. For this particular discussion, it will be assumed that the intervening device 28 does not exist and that the connections are direct. It will also be noted that the terminals 18 and 20 are connected together by a jumper and that the terminals 22 and 24 are connected together by a jumper.

The static phase converter also comprises a timer 38 including a timing control potentiometer 32 and an output symbolized by normally-open contacts 40. This timer may be a solid-state device and comprise a timing circuit which operates to "close" the contacts 40 after a preset interval, typically 0.25-5 seconds. The timer is connected to the input terminal 12 and, by way of a reset pushbutton 44 and the output terminals 20 and 18, to the input terminal 14.

The static phase converter further comprises a power relay 46 which includes a relay winding 48 and normally-closed contacts 50. The relay winding 48 is connected at one end to the input terminal 12 and at the other end to the contacts 40 of the timer 48 for connection thereby to the second input terminal 14. The contacts 50 are connected, on the one hand, to the input terminal 12 and, on the other hand, to one side of a starting capacitor 62 whose other side is connected to the output terminals 22 and 24. The contacts 50 are also connected by way of a resistor 58 to one side of a running capacitor 54 whose other side is connected to the input terminal 12. The contacts 50, therefore, prior to the application of the single-phase alternating voltage, essentially shunt the running capacitor 54 and connect the starting capacitor 62 to the motor winding 36 by way of the output terminals 22 and 24.

Two indicator lamps 52 and 60 are also provided. The indicator lamp 52 is connected across the relay winding 48 and is energized therewith to indicate energization of the relay winding and termination of the starting mode. The lamp 60 is connected across the resistor 58 and is in series with the parallel combination of the running capacitor 54 and a resistor 56. It is therefore evident that the lamp 60 is a "start" indicator and the lamp 52 is a "run" indicator.

As is quite evident from the foregoing, upon application of a single-phase alternating voltage at the terminals 12 and 14, the same is applied by way of the output terminals 16 and 18, 20 across the windings 32, 34 of the single-speed, three-phase motor 30. At the same instant, the timer 38 initiates the preset timing interval. Also, at the same time, the input terminal 12 is connected by way of the contacts 50 of the relay 46, the starting capacitor 62 and the output terminals 22 and 24 to the winding 36 of the motor 30, providing a phase shift of less than 90° to provide the starting torque.

After timing of the predetermined interval, the output of the timer 38, here indicated by contacts 40, connects the relay winding 48 across the input terminals 12 and 14 to open the contacts 50 and reconfigure the connections of the starting capacitor 62 and the running capacitor 54, along with the resistors 56 and 58, and the lamp 60, are reconfigured such that the parallel-connected running capacitor 54 and the resistor 56 are connected in series between the input terminal 12 and the winding 36 of the motor 30 by way of the terminal 24 and the parallel-connected lamp 60 and the high-resistance resistor 58 place the starting capacitor 62 in a high-impedance connection which is shunted by the jumper between the output terminals 22 and 24.

Three-Phase, Two-Speed Application

Three-phase, two-speed application is exactly the same as set forth above for single-speed, three-phase operation. The only exception, and one which does not affect the static phase converter as discussed above, is the provision of the element 28.

In this application, it is assumed that the windings 32, 34 and 36 of the motor 30 are either the high-speed windings or the low-speed windings. Connection of one set of windings or the other to the static phase converter is accomplished by the well-known speed selection contactors provided with two-speed motors. This is symbolically indicated by the element 28 and provides that one set of windings or the other are connected for high-torque starting for a predetermined interval by the converter.

Provision of Additional Torque

In order to provide additional torque to match the converter to the particular motor, a torque increasing device is provided and is generally illustrated as comprising a capacitance 68 and a pair of terminals 64, 66 respectively connected to the terminals 24, 26 of the converter. This is only a schematic and symbolic indication of a plurality of capacitors which may be selectively connected in series and/or parallel to obtain the desired capacitance which, in parallel with the capacitor 62, provides the desired torque for the motor.

Reapplication of Starting Torque

There are many instances in which a motor experiences load conditions which may cause the same to undergo a speed reduction so that it cannot reattain synchronous speed. In those instances in which the converter is mounted such that it is readily accessible to the operator, he need only depress the spring-loaded pushbutton 44 to reset the timer 38 which causes the relay contacts 50 to close and place the converter in the starting mode with the starting capacitor 62 connected in circuit with the motor winding 36. After timing out, the converter goes into the run mode.

In those instances in which the converter is not accessible to the operator, a remote switch 70 may be provided and the jumper between the output terminals 18 and 20 removed. Depression of the pushbutton for the switch 70 will cause the same operation.

In case the converter is employed in connection with, for example, an air compressor in which the compressed air tank includes a pressure switch, the pressure switch may constitute the switch 70 so that starting torque is automatically applied to the motor for the predetermined interval set at the timer 38.

The resistors 56 and 58 are bleed resistors to protect the user and protect and prolong the life of the contacts 50 of the relay 46.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A static phase converter for starting and running a three-phase motor having first, second and third field windings, comprising:

first and second input terminals for receiving a single-phase alternating voltage;

conductors connected to said input terminals for connecting the single-phase alternating voltage to the first and second windings;

starting and running capacitors for connection to the third winding;

switch means connected to said starting and running capacitors and to said first input terminal and operable in a first mode to shunt said running capacitor and connect said starting capacitor between said first input terminal and the third winding to apply a phase shifted voltage to the third winding and develop starting torque for the motor, and in a second mode to shunt said starting capacitor and connect said running capacitor between said first input terminal and the third winding and apply a phase-shifted running voltage to the third winding; and a timer connected to said input terminals and to said switch means and operable upon the receipt of the single-phase alternating voltage to operate said switch means from its first mode to its second mode after a predetermined interval.

2. The static phase converter of claim 1, wherein said converter further comprises:

a reset switch connected between said timer and one of said input terminals for resetting said timer and causing said switch means to reassume its first mode to reapply starting torque to the motor.

3. The static phase converter of claim 1, and further comprising:

capacitance means for connection to said starting capacitor to adapt the starting torque to the requirements of the motor.

4. A static phase converter for starting a three-phase motor having at least three windings, comprising:

first and second input terminals for receiving an alternating voltage;

first, second and third output terminals for connection to the first, second and third windings, respectively;

starting capacitance connected to said third output terminal, and a running capacitance connected between said first input terminal and said third output terminal;

switch means connected to said input terminals connecting the alternating voltage, upon receipt thereof, across said first and second output terminals, shunting said running capacitance and connecting said starting capacitance to said first input terminal to apply the alternating voltage, phase-shifted, across said third and second windings; and control means connected to said first and second input terminals and to said switch means and operable, a predetermined interval after receipt of the alternating voltage to disconnect said starting capacitance from said first input terminal and opening the shunt of said running capacitance to provide the alternating voltage, at a second phase shift, across said second and third output terminals.

5. The static phase converter of claim 4, wherein said control means comprises:
a solid-state adjustable time delay circuit.

6. The static phase converter of claim 4, wherein:
said switch means comprises a relay including a relay winding connected to said first input terminal, and normally-closed contacts connected to said first input terminal, to said starting capacitance and to said running capacitance; and
said control means comprises a time delay circuit connected across said first and second input terminals and normally-open contacts connected between said relay winding and said second input terminal.

7. The static phase converter of claim 5, wherein:
said time delay means comprises an adjustable time delay circuit.

8. A static phase converter for starting a motor having at least first, second and third windings, comprising:
first and second input terminals for receiving a single-phase alternating voltage;
first, second, third, fourth and fifth output terminals, said first output terminal adapted for connection to the first winding, said second and third output terminals connected together and adapted for connection to the second winding, and said fourth and fifth output terminals connected together and adapted for connection to the third winding;
said first and second input terminals respectively connected to said first output terminal and said second and third connected output terminals to energize said first and second windings upon the receipt of alternating current;
capacitance means, including running capacitance connected between said first input terminal and said fourth and fifth output terminals to provide an alternating voltage with a phase shift, with respect to the applied voltage, at the third winding, sufficient to maintain motor operation after starting, and starting capacitance connected between said fourth and fifth output terminals to provide starting a phase-shifted alternating voltage at the third winding, to develop starting torque for the motor for a predetermined interval; and
starting control means connected to said first and second input terminals, comprising relay means including a normally-closed contact connecting said first input terminal to said starting capacitance and shunting said running capacitance, and delay means connected to said relay means and time responsive to the application of the alternating voltage at said first and second input terminals to operate said relay means to open said normally-closed contacts, remove the shunt of said running capacitance, and disconnect said starting capacitance from said first input terminal.

9. The static phase converter of claim 8, wherein:
said relay means comprises a relay winding connected to said first input terminal; and
said time delay means comprises normally-open contacts connected between said relay winding and said second input terminal and operated to close after said predetermined interval.

10. The static phase converter of claim 9, wherein:
said time delay means comprises adjustment means for adjusting said predetermined interval.

11. The static phase converter of claim 8, and further comprising:
a further capacitance connected in parallel with said starting capacitance to increase the starting torque of the motor.

12. The static phase converter of claim 8, and further comprising:
an indicator lamp connected across said relay means for indicating the running mode.

13. The static phase converter of claim 8, and further comprising:
an indicator lamp connected across said starting capacitance to indicate the starting mode.

14. The static phase converter of claim 8, and further comprising:
additional capacitance connected across said starting capacitance for increasing the starting torque.

15. The static phase converter of claim 8, and further comprising:
a switch connected between said time delay means and said second input terminal for cutting-off the starting operation.

16. The static phase converter of claim 8, and further comprising:
a resistor connected across said running capacitance.

17. The static phase converter of claim 8, and further comprising:
a resistor connected between said running capacitance and said starting capacitance.

18. A static converter for starting a two-speed, three-phase motor comprising high-speed and low-speed windings each including first, second and third windings which are selectively connected by way of contactors for high or low-speed operation such that respective first, second and third windings are selected for energization, comprising:
first and second input terminals for receiving an alternating voltage;
first, second and third output terminals for connection to the selected first, second and third windings, respectively;
starting capacitance connected to said third output terminal, and a running capacitance connected between said first input terminal and said third output terminal;
switch means connected to said input terminals connecting the alternating voltage, upon receipt thereof, across said first and second output terminals and the selected first and second windings, shunting said running capacitance and connecting said starting capacitance to said first input terminal to apply the alternating voltage, phase-shifted, across the selected third and second windings; and control means connected to said first and second input terminals and to said switch means and operable, a predetermined interval after receipt of the alternating voltage, to disconnect said starting capacitance from said first input terminal and opening the shunt of said running capacitance to provide the alternating voltage, phase-shifted, across said second and third output terminals.

19. In a motor control of the type for starting and running a three-phase synchronous motor which comprises at least three field windings at least one of which has a running capacitor connected thereto, and in which, normally, a feedback connection to one of the windings provides a signal to operate a switch as the motor approaches synchronous speed to disconnect a starting capacitor from one of the windings, the improvement comprising:

conductor means for receiving a single-phase input voltage and applying the same to first and second ones of the motor windings;

a relay comprising contacts interconnected with the running and starting capacitors and operable for applying a phase-shifted voltage to the third winding of the motor via the starting capacitor during a starting mode to produce starting torque and via the running capacitor during a running mode to produce running torque; and timing means defining said starting and running modes, said timing means connected to said conductor means and to said relay and operable in response to and at a predetermined time interval after the application of the single-phase input voltage to cause said relay to transfer from the starting mode into the running mode.

20. In a motor control system of the type in which a synchronous motor connected to a start and run control, drives a load which intermittently increases to such an extent that motor speed is reduced sufficiently that synchronous speed cannot be reattained, the improvement in the start and run control comprising:

first means connected to an alternating voltage source and to the motor for controlling the application starting torque to the motor; and second means connected to the source and to said first means and operable to cause said first means to apply starting torque to the running and slowing motor for a predetermined interval.

21. The improvement of claim 20, wherein said second means comprises:

a timer connected to control said first means and timed-out after starting; and a manual switch connected to said timer and operable to reset said timer to again initiate timing.

22. The improvement of claim 21, wherein said second means comprises:

a timer connected to control said first means and timed-out after starting; and a switch located at and operated by the load, said switch connected to said timer and operable to reset said timer to again initiate timing.

23. In a motor control of the type for starting and running a three-phase synchronous motor which comprises at least three field windings at least one of which has a running capacitor connected thereto, and in which, normally, a feedback connection to one of the windings provides a signal to operate a switch as the motor approaches synchronous speed to disconnect a starting capacitor from one of the windings, the improvement comprising:

conductor means for receiving a single-phase input voltage and applying the same to first and second ones of the motor windings;

a relay comprising contacts interconnected with the running and starting capacitors and operable for applying a phase-shifted voltage to the third winding of the motor via the starting capacitor and the running capacitor during a starting mode to produce starting torque and via the running capacitor during a running mode to produce running torque; and timing means defining said starting and running modes, said timing means connected to said conductor means and to said relay and operable in response to and at a predetermined time interval after the application of the single-phase input voltage to cause said relay to transfer from the starting mode into the running mode.

* * * * *